US012764419B2

(12) United States Patent
Kawanishi

(10) Patent No.: US 12,764,419 B2
(45) Date of Patent: Oct. 13, 2026

(54) FOCUS CONTROL APPARATUS AND METHOD, IMAGE CAPTURING APPARATUS, AND RECORDING MEDIUM WITH FOCUS ADJUSTMENT BASED ON SUBJECT'S MOVEMENT AND FOCUS RING OPERATION

(71) Applicant: CANON KABUSHIKI KAISHA, Tokyo (JP)

(72) Inventor: Atsuya Kawanishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 18/524,759

(22) Filed: Nov. 30, 2023

(65) Prior Publication Data

US 2024/0196088 A1 Jun. 13, 2024

(30) Foreign Application Priority Data

Dec. 8, 2022 (JP) ................................. 2022-196563

(51) Int. Cl.
*H04N 23/67* (2023.01)
*G03B 13/36* (2021.01)
*H04N 23/667* (2023.01)

(52) U.S. Cl.
CPC ............. *H04N 23/67* (2023.01); *G03B 13/36* (2013.01); *H04N 23/667* (2023.01)

(58) Field of Classification Search
CPC ...... G03B 13/36; H04N 23/61; H04N 23/667; H04N 23/67; H04N 23/672; H04N 23/673; H04N 23/675
See application file for complete search history.

(56) References Cited

U.S. PATENT DOCUMENTS

| | | | | |
|---|---|---|---|---|
| 10,945,591 | B2 * | 3/2021 | Yoshino | A61B 1/042 |
| 12,401,896 | B2 * | 8/2025 | Inomata | H04N 23/632 |
| 2001/0055110 | A1 * | 12/2001 | Suzuki | G01C 1/02 396/89 |
| 2018/0242829 | A1 * | 8/2018 | Yoshino | G02B 7/09 |
| 2023/0276126 | A1 * | 8/2023 | Inomata | G02B 7/28 348/345 |
| 2023/0300460 | A1 * | 9/2023 | Saito | H04N 23/611 |

FOREIGN PATENT DOCUMENTS

| | | | | |
|---|---|---|---|---|
| JP | 2016-130793 A | 7/2016 | | |
| JP | 2016-218161 A | 12/2016 | | |
| WO | WO-2022113893 A1 * | 6/2022 | | H04N 23/695 |

* cited by examiner

*Primary Examiner* — Antoinette T Spinks

(74) *Attorney, Agent, or Firm* — Cowan, Liebowitz & Latman, P.C.

(57) ABSTRACT

A focus control apparatus comprising an acquisition unit that acquires operation information of an operation member for operating a focus lens; a detection unit that detects a subject based on an image signal obtained from an image sensor; and a control unit that selects a first focus adjustment unit that performs autofocus adjustment based on the image signal or a second focus adjustment unit that performs manual focus adjustment based on operation of the operation member. The control unit selects the first focus adjustment unit or the second focus adjustment unit based on movement of the subject and the operation information.

10 Claims, 6 Drawing Sheets

FOCUS CONTROL APPARATUS AND METHOD, IMAGE CAPTURING APPARATUS, AND RECORDING MEDIUM WITH FOCUS ADJUSTMENT BASED ON SUBJECT'S MOVEMENT AND FOCUS RING OPERATION

BACKGROUND OF THE INVENTION

Field of the Invention

The present invention relates to a focus control apparatus and method, an image capturing apparatus, and a recording medium.

Description of the Related Art

In recent years, in the field of image capturing apparatuses such as mirrorless cameras, shooting while viewing a live view image has become mainstream, and the demand for moving image shooting has been increasing. In moving image shooting, the stability and quality of the focusing operation are important, and it is necessary to prevent the focus from becoming unstable and to achieve smooth focus adjustment.

On the other hand, with the increase in the number of pixels in image capturing apparatuses and improvements in subject detection technology, assist technology that allows cameras to automatically assist focusing operations as needed when it is difficult for the user to maintain focus manually has become important. Japanese Patent Laid-Open No. 2016-130793 and No. 2016-218161 disclose a method of automatically switching between manual focus and autofocus according to a defocus amount detected by a camera.

However, in the conventional technologies disclosed in Japanese Patent Laid-Open No. 2016-130793 and No. 2016-218161, both automatically switch to autofocus when the detected defocus amount is small, so the following problems occur. That is, there have been cases where a subject to which the user does not intend is brought into focus during the process of manual focus operation, or the focus has become unstable due to variations in focus detection results.

SUMMARY OF THE INVENTION

The present invention has been made in consideration of the above situation, and can perform focus adjustment control according to the user's intentions.

According to the present invention, provided is a focus control apparatus comprising one or more processors and/or circuitry which function as: an acquisition unit that acquires operation information of an operation member for operating a focus lens; a detection unit that detects a subject based on an image signal obtained from an image sensor; and a control unit that selects a first focus adjustment unit that performs autofocus adjustment based on the image signal or a second focus adjustment unit that performs manual focus adjustment based on operation of the operation member, wherein the control unit selects the first focus adjustment unit or the second focus adjustment unit based on movement of the subject and the operation information.

Further, according to the present invention, provided is an image capturing apparatus comprising: an image sensor; a first focus adjustment unit that performs autofocus adjustment based on an image signal obtained from the image sensor; an operation member for operating a focus lens; a second focus adjustment unit that performs manual focus adjustment based on operation of the operation member; and a focus control apparatus comprising one or more processors and/or circuitry which function as: an acquisition unit that acquires operation information of an operation member for operating a focus lens; a detection unit that detects a subject based on an image signal obtained from an image sensor; and a control unit that selects a first focus adjustment unit that performs autofocus adjustment based on the image signal or a second focus adjustment unit that performs manual focus adjustment based on operation of the operation member, wherein the control unit selects the first focus adjustment unit or the second focus adjustment unit based on movement of the subject and the operation information.

Furthermore, according to the present invention, provided is a focus adjustment control method comprising: acquiring operation information of an operation member for operating a focus lens; detecting a subject based on an image signal obtained from an image sensor; and selecting a first focus adjustment unit that performs autofocus adjustment based on the image signal or a second focus adjustment unit that performs manual focus adjustment based on operation of the operation member, wherein the first focus adjustment unit or the second focus adjustment unit is selected based on movement of the subject and the operation information.

Further, according to the present invention, provided is a non-transitory computer-readable storage medium, the storage medium storing a program that is executable by the computer, wherein the program includes program code for causing the computer to function as a focus control apparatus comprising: an acquisition unit that acquires operation information of an operation member for operating a focus lens; a detection unit that detects a subject based on an image signal obtained from an image sensor; and a control unit that selects a first focus adjustment unit that performs autofocus adjustment based on the image signal or a second focus adjustment unit that performs manual focus adjustment based on operation of the operation member, wherein the control unit selects the first focus adjustment unit or the second focus adjustment unit based on movement of the subject and the operation information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
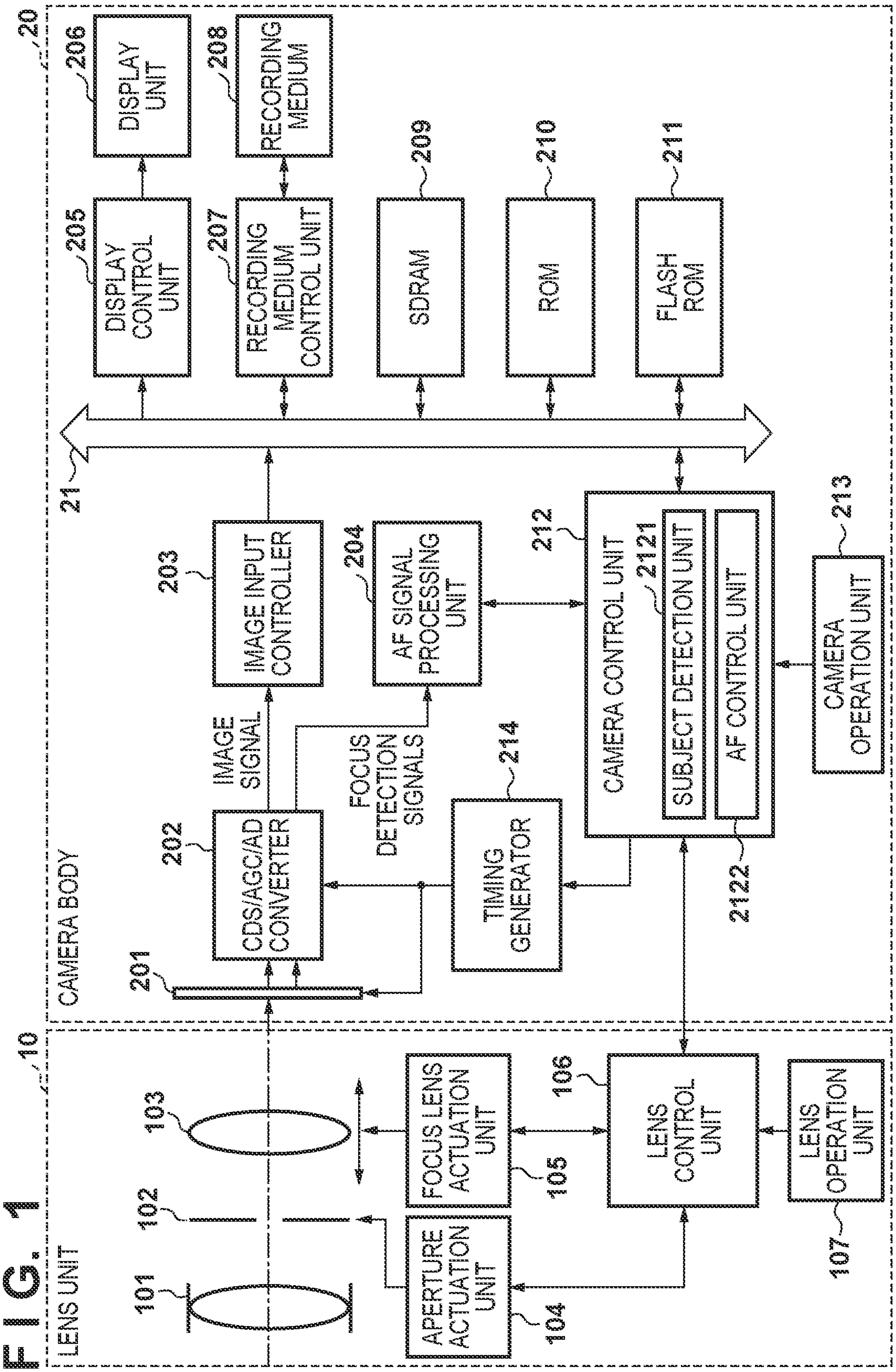
FIG. 1 is a block diagram showing a configuration of an image capturing apparatus according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing the configuration of an image capturing apparatus according to a first embodiment of the present invention. The image capturing apparatus of this embodiment has a configuration of an interchangeable lens type camera in which a lens unit 10 and a camera body 20 are removably connected to each other via a mount section (not shown). The lens control section 106 that controls the overall operation of the entire lens unit 10 and the camera control section 212 that controls the overall operation of the entire image capturing apparatus communicate information with each other through terminals provided on the mount section.

First, the configuration of the lens unit 10 will be explained. The lens unit 10 includes a fixed lens 101, an aperture 102, a focus lens 103, an aperture actuation unit 104, a focus lens actuation unit 105, a lens control unit 106, and a lens operation unit 107. The fixed lens 101, the aperture 102 and the focus lens 103 constitute an imaging optical system. The aperture 102 is driven by the aperture actuation unit 104, and controls the amount of light to be incident on an image sensor 201, which will be described later. The focus lens 103 is driven by the focus lens actuation unit 105, and adjusts the focus of an image formed on the image sensor 201, which will be described later. The aperture actuation unit 104 and focus lens actuation unit 105 are controlled by the lens control unit 106 to control the aperture amount of the aperture 102 and move the position of the focus lens 103, respectively.

The lens operation unit 107 is a group of input devices for the user to perform settings related to the operation of the lens unit 10, such as switching between autofocus (AF) mode and manual focus (MF) mode, adjusting the position of the focus lens by MF, and setting the image stabilization mode. When the lens operation unit 107 is operated, the lens control unit 106 performs control according to the operation.

The lens control unit 106 controls the aperture actuation unit 104 and the focus lens actuation unit 105 according to control commands and control information received from a camera control unit 212, which will be described later, and also sends lens control information to the camera control unit 212.

Next, the configuration of the camera body 20 will be explained. The camera body 20 is configured to photoelectrically convert the light flux that has passed through the imaging optical system of the lens unit 10 to obtain an image signal.

The image sensor 201 may be configured with a CCD, CMOS sensor, or the like. The light flux that enters through the imaging optical system of lens unit 10 forms an image on the light receiving surface of the image sensor 201, and is converted into signal charge according to the amount of incident light by photodiodes formed in pixels arranged in the image sensor 201. The signal charge accumulated in each photodiode is sequentially read out from the image sensor 201 as a voltage signal corresponding to the signal charge in accordance with actuation pulses output by a timing generator 214 based on commands from the camera control unit 212.

Figure 2:
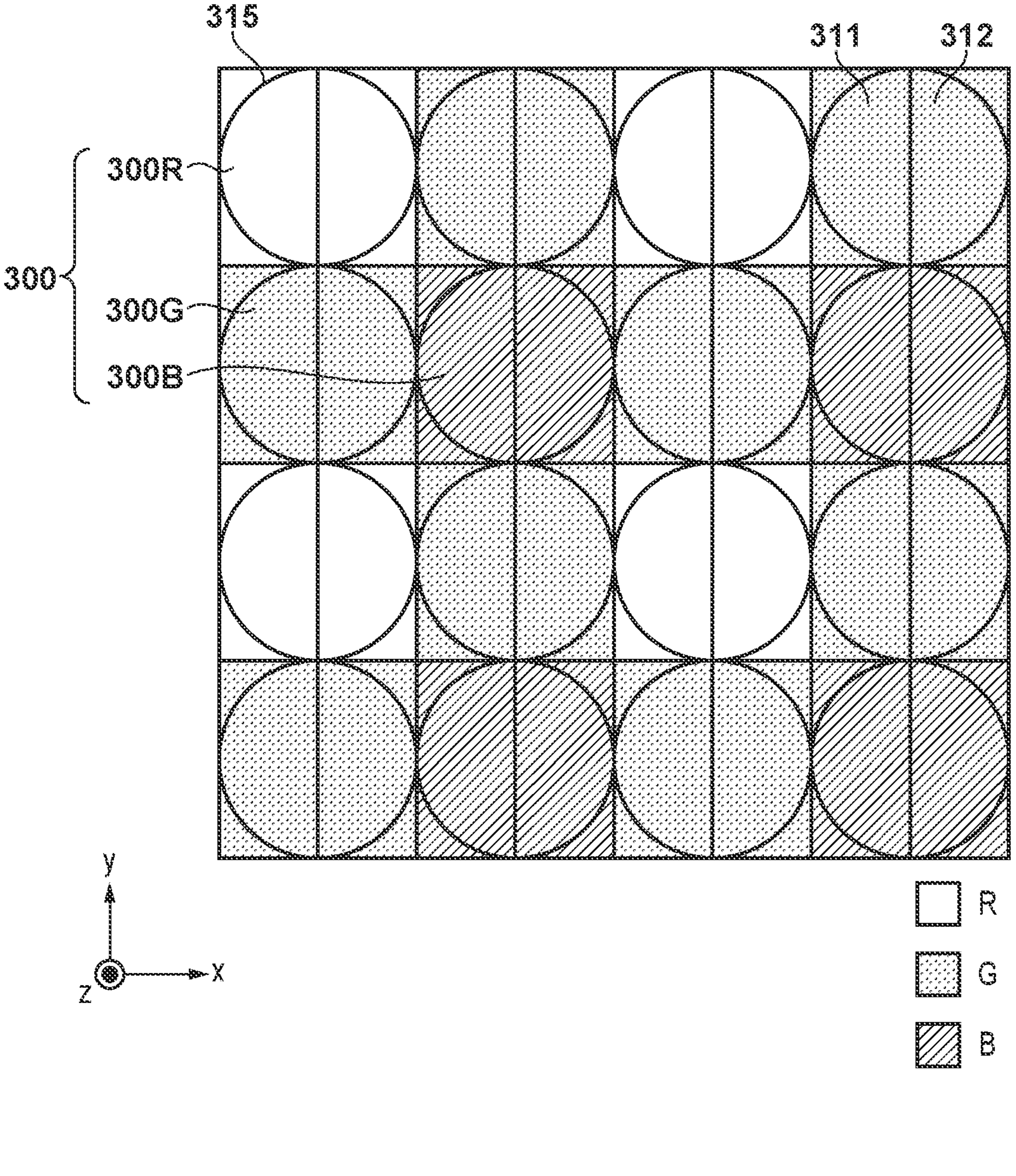
FIG. 2 is a schematic diagram of a pixel arrangement of an image sensor according to the embodiment.

Here, with reference to FIG. 2, a configuration example of the image sensor 201 and signals to be read out will be described. FIG. 2 is a diagram schematically showing the pixel array of the image sensor 201 in this embodiment, wherein the pixel array of a two-dimensional CMOS sensor used as the image sensor 201 is shown in a range of 4 columns×4 rows of imaging pixels (a range of 8 columns×4 rows as an array of focus detection pixels).

In this embodiment, it is assumed that a pixel group 300 is composed of pixels of two columns and two rows, and is covered with a Bayer array color filter. In each pixel group 300, a pixel 300R having a spectral sensitivity of R (red) is located at the upper left position, a pixel 300G having a spectral sensitivity of G (green) is located at the upper right and lower left positions, and a pixel 300B having a spectral sensitivity of B (blue) is located at lower right position. Furthermore, in the image sensor 201 of this embodiment, each pixel has a plurality of photodiodes (photoelectric conversion units) for one microlens 315 in order to perform on-imaging plane phase difference focus detection. In this embodiment, it is assumed that each pixel has two photodiodes 311 and 312 arranged in two columns and one row.

The image sensor 201 enables image signals and AF signals to be acquired by arranging a large number of pixel groups 300 consisting of 2 columns×2 rows of pixels (4 columns×2 rows of photodiodes) as shown in FIG. 2 on the imaging surface.

In each pixel having such a configuration, the light fluxes that have passed through different pupil regions of the imaging optical system of the lens unit 10 are separated by the microlens 315 and formed on the photodiodes 311 and 312. The signal obtained by adding the signals from the two photodiodes 311 and 312 (A+B signal) is used as an image signal for recording, and the two signals (A signal, B signal) read out from respective photodiodes 311 and 312 are used as focus detection signals. Note that the image signal and the focus detection signals may be read out respectively, but the following method may be used in consideration of reducing the processing load. That is, by reading out the image signal (A+B signal) and the focus detection signal (for example, A signal) from one of the photodiodes 311 and 312 and taking the difference, the other focus detection signal (for example, B signal) having parallax is obtained. Using the focus detection signals obtained in this manner, focus detection using an on-imaging plane phase difference method (on-imaging plane phase difference AF) can be performed.

Note that, in this embodiment, each pixel has two photodiodes 311 and 312 for one microlens 315, but the number of photodiodes is not limited to two and may be more. Further, the pupil division direction is not limited to the horizontal direction, but may be the vertical direction. Further, a plurality of pixels whose aperture regions of light receiving portions with respect to the microlens 315 are different from each other may be used. In other words, any configuration is sufficient as long as two signals for phase difference detection, such as the A signal and the B signal are obtained. Furthermore, the present invention is not limited to the configuration in which every pixel has a plurality of photodiodes as shown in FIG. 2, but may be a configuration in which pixels each having a plurality of photodiodes as shown in FIG. 2 are provided discretely among normal pixels constituting the image sensor 201. Further, a plurality of types of pixels divided in different manner may be included in the image sensor.

Returning to FIG. 1, the image signal and focus detection signals read out from the image sensor 201 are input to a CDS/AGC/AD converter 202, where they are subjected to correlated double sampling to remove reset noise, gain adjustment, and AD conversion. The CDS/AGC/AD converter 202 outputs the processed image signal to an image input controller 203 and the focus detection signals to an AF signal processing unit 204.

The image input controller 203 stores the image signal output from the CDS/AGC/AD converter 202 into an SDRAM 209 via a bus 21.

The image signal stored in the SDRAM 209 is displayed on a display unit 206 by a display control unit 205 via the bus 21. Further, in a case of recording the image signal, a recording medium control unit 207 records the image signal on a recording medium 208 such as a semiconductor memory.

Further, a ROM 210 connected via the bus 21 stores control programs and processing programs executed by the camera control unit 212, and various data necessary for executing these programs. A flash ROM 211 stores various setting information regarding the operation of the camera body 20 set by the user.

Further, a subject detection unit 2121 in the camera control unit 212 detects a predetermined subject based on the image signal stored in the SDRAM 209, and specifies the position of the detected subject in the image expressed by the image signal. In addition, an image signal is continuously input from the image input controller 203, and if the detected subject moves, the position of the moving destination is specified thereby the subject is tracked. Note that the predetermined subject may be, for example, a human face, a subject existing at a position specified by the user on the screen on which the image is displayed using a camera operation unit 213, or the like. As will be described later, information regarding the detected position and size of the subject can be used to set an area for AF.

The AF signal processing unit 204 performs correlation calculation between an A image configured by collecting A signals and a B image configured by collecting B signals of focus detection signals within a preset focus detection area from among a pair of focus detection signals output from the CDS/AGC/AD converter 202. Then, the image shift amount and reliability between the A image and the B image obtained by the correlation calculation are calculated and output to the camera control unit 212. Reliability is calculated using the two-image matching degree and the steepness of the correlation change amount. Note that the description of calculation methods of the correlation and reliability performed here will be omitted since known methods may be used. Note that the AF signal processing unit 204 sets the position and size of the focus detection area for performing the on-imaging plane phase difference AF based on the information and instructions shown below obtained from the camera control unit 212.

First, the AF control unit 2122 in the camera control unit 212 instructs to change the settings of the AF signal processing unit 204 as needed based on the image shift amount and reliability calculated by the AF signal processing unit 204 and information indicating the states of the lens unit 10 and camera body 20. For example, if the image shift amount is more than a predetermined amount, the AF signal processing unit 204 may be instructed to widen the focus detection area, or the type of bandpass filter applied to the focus detection signal may be changed depending on the contrast of a pair of focus detection signals.

Furthermore, in order to set the focus detection area, the specific subject detected by the subject detection unit 2121 in the camera control unit 212 and the position and size specified by the user on the imaging screen using the camera operation section 213 are sent to the AF signal processing unit 204.

The camera control unit 212 controls each part of the camera body 20 while exchanging information with them. In addition, the camera control unit 212 performs various processes corresponding to user operations, such as turning the power ON/OFF, changing various settings, selecting still image shooting mode/moving image shooting mode, image shooting processing, AF processing, and playback processing of recorded images in response to input from the camera operation unit 213 based on user operations. Furthermore, the camera control unit 212 sends control commands to the lens unit 10 (lens control unit 106) and information about the camera body 20 to the lens control unit 106, and obtains information about the lens unit 10 from the lens control unit 106. The camera control unit 212 is composed of a microcomputer or the like, and controls the entire image capturing apparatus including the interchangeable lens 10 by executing a computer program stored in the ROM 210.

Further, the camera control unit 212 calculates a defocus amount by a known method such as multiplying the image shift amount calculated by the AF signal processing unit 204 by a conversion coefficient, and controls the actuation of the focus lens 103 through the lens control unit 106 based on the calculated defocus amount.

Next, focus adjustment control performed in a case where the moving image shooting mode is set in the image capturing apparatus having the above configuration will be described with reference to the flowchart of FIG. 3. It should be noted that it is also possible to perform the focus adjustment control during live view shooting in the still image shooting mode. This focus adjustment control is performed by the camera control unit 212 executing a focus adjustment control processing program that is a computer program.

First, in step S301, the camera control unit 212 uses the subject detection unit 2121 to detect a subject to be focused on from a captured image. In this embodiment, the type of the subject, such as a person, an animal such as a dog or a wild bird, or a vehicle such as a two-wheeled vehicle or a four-wheeled vehicle, as well as the main part of the subject can be detected. Note that the main part refers to the eyes, face, or body of a person or animal, and a part or body of a vehicle. Since it is possible to use known techniques such as deep learning techniques and image processing means for these detection processes, the details will be omitted.

Next, in step S302, the camera control unit 212 causes the AF signal processing unit 204 to perform focus detection processing. In the focus detection processing performed here, a correlation calculation is performed using the focus detection signals obtained from the image sensor 201, and information on the image shift amount and reliability is obtained. Further, the focus detection area within the imaging screen is set according to instructions and information from the camera control unit 212.

Subsequently, in step S303, the camera control unit 212 converts the image shift amount calculated in the focus detection processing of step S302 into a defocus amount. Then, based on the history of the converted defocus amounts, a moving subject determination processing is performed to determine whether the position of the image plane is continuously moving in the optical axis direction of the imaging optical system.

Subsequently, in step S304, the camera control unit 212 acquires the current focus detection mode, and if the mode is the MF mode, the process proceeds to step S305, and if the mode is the AF mode, the process proceeds to step S311.

In step S305, the camera control unit 212 determines whether or not the subject was detected in step S301. If the subject was detected, the process proceeds to step S306; if not, the process proceeds to step S310.

In step S306, the camera control unit 212 determines whether or not the position of the image plane of the detected subject is continuously moving in the optical axis direction as a result of the moving subject determination processing in step S303. If it is determined that the position of the image plane is moving, the process advances to step S307; otherwise, the process advances to step S310.

In step S307, the camera control unit 212 acquires operation information regarding the focus ring operation of the lens operation unit 107 via the lens control unit 106. Next, in step S308, the camera control unit 212 determines whether or not the focus ring is operated so that the moving direction of the position of the image plane of the subject and the moving direction of the focal position of the focus lens 103 are the same with respect to the optical axis direction. If it is determined that the focus ring is operated so that the moving directions coincide, the process advances to step S309, whereas if it is determined that the focus ring is operated so that the moving directions are opposite, the process advances to step S310.

In step S309, the focus detection mode is changed from the MF mode to the AF mode. Then, a UI display indicating the AF mode and on-imaging plane phase difference AF control are performed. On the other hand, if no subject is detected (NO in step S305), if the position of the image plane of the subject is not moving continuously in the optical axis direction (NO in step S306), or if the moving direction of the position of the image plane of the subject and the moving direction of focus position of the focus lens 103 by the focus ring operation are opposite (NO in step S308), the MF mode is maintained in step S310. Then, the MF control is executed according to the UI display indicating the MF mode and the user's operation.

In this way, in a case where the subject is moving in the optical axis direction and it is determined that the user is trying to keep the subject in focus by operating the focus ring, the focus detection mode is automatically switched to the AF mode, thereby focus adjustment accuracy can be improved. On the other hand, in cases where AF cannot be performed because no subject is detected, there is no movement of the subject in the optical axis direction, or movement of the detected subject and operation of the focus ring are inconsistent, the MF mode is maintained, thereby the focus can be adjusted according to the user's intention.

On the other hand, if is determined in step S304 that the AF mode is set since the focus detection mode is set to the AF mode in step S309, for example, the process proceeds to step S311, and the camera control unit 212 determines whether or not a subject was detected in step S301. If the subject was detected, the process moves to step S312; if no subject is detected, the process moves to step S314.

In step S312, the camera control unit 212 determines whether or not the position of the image plane of the detected subject is continuously moving in the optical axis direction as a result of the moving subject determination processing in step S303. If it is determined that the position of the image plane is moving in the optical axis direction, the process advances to step S313; otherwise, the process advances to step S314.

In step S313, the camera control unit 212 maintains the AF mode, displays a UI indicating the AF mode, and executes the on-imaging plane phase difference AF control. On the other hand, if the subject was not detected (NO in step S311) or if the position of the image plane of the subject is not moving continuously in the optical axis direction (NO in step S312), then in step S314, the camera control unit 212 changes the focus detection mode from the AF mode to the MF mode. Then, the camera control unit 212 displays a UI indicating the MF mode and executes MF control according to the user's operation.

In this way, in a case where the subject is moving in the optical axis direction, by maintaining the AF mode, it is possible to continue to accurately focus on the subject being detected. On the other hand, if the subject is no longer detected and focus cannot be controlled by AF, or if the position of the image plane of the subject no longer moves in the optical axis direction, switching to MF mode allows the focus to be adjusted according to the user's intention.

The above-mentioned control allows automatic focusing when necessary, as well as automatically returning to the MF mode in a case where automatic focusing is not possible or in a case where it is presumed that the user would like to focus manually.

Figure 3:
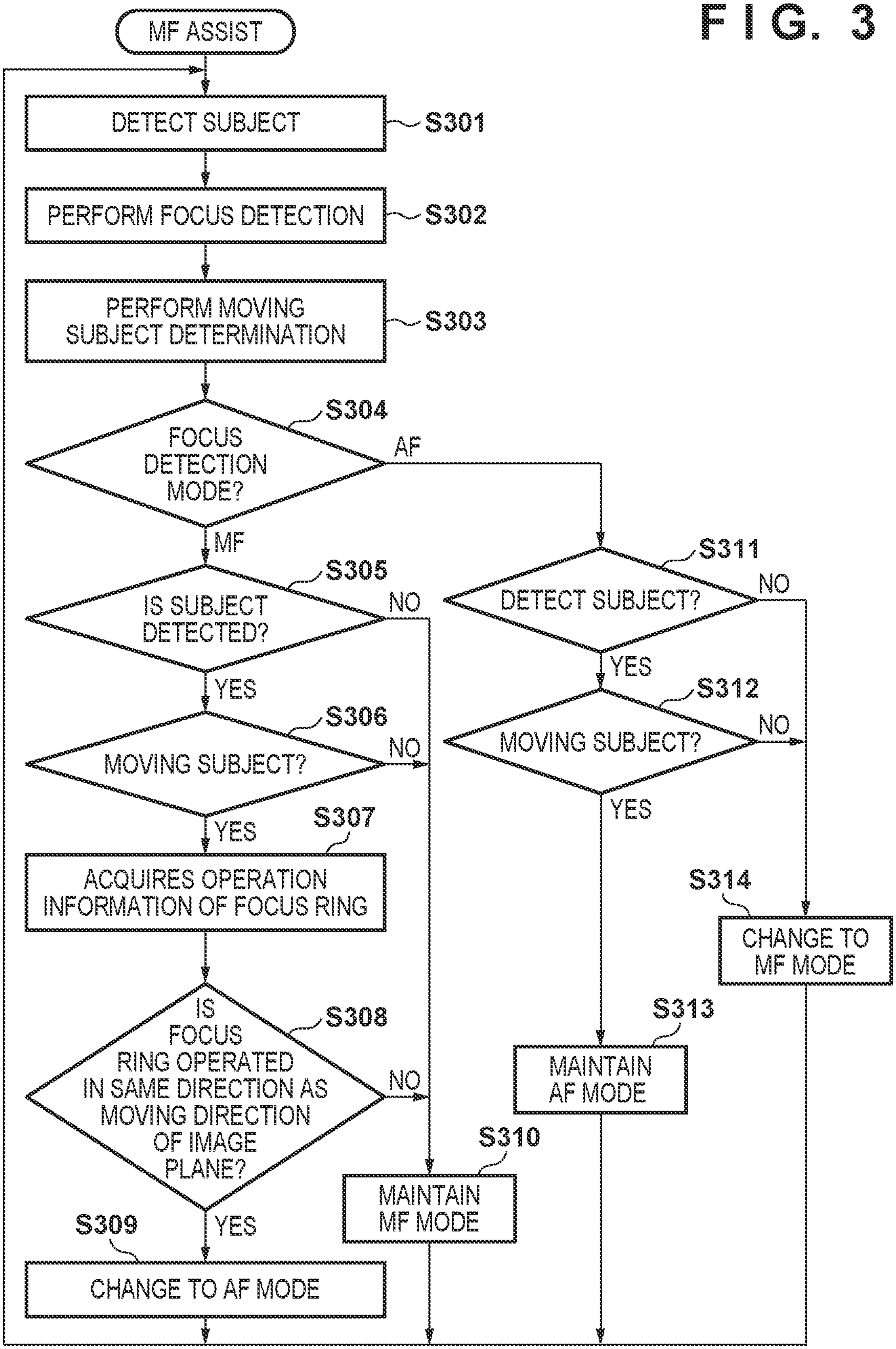
FIG. 3 is a flowchart of focus adjustment control according to a first embodiment.
Figure 4:
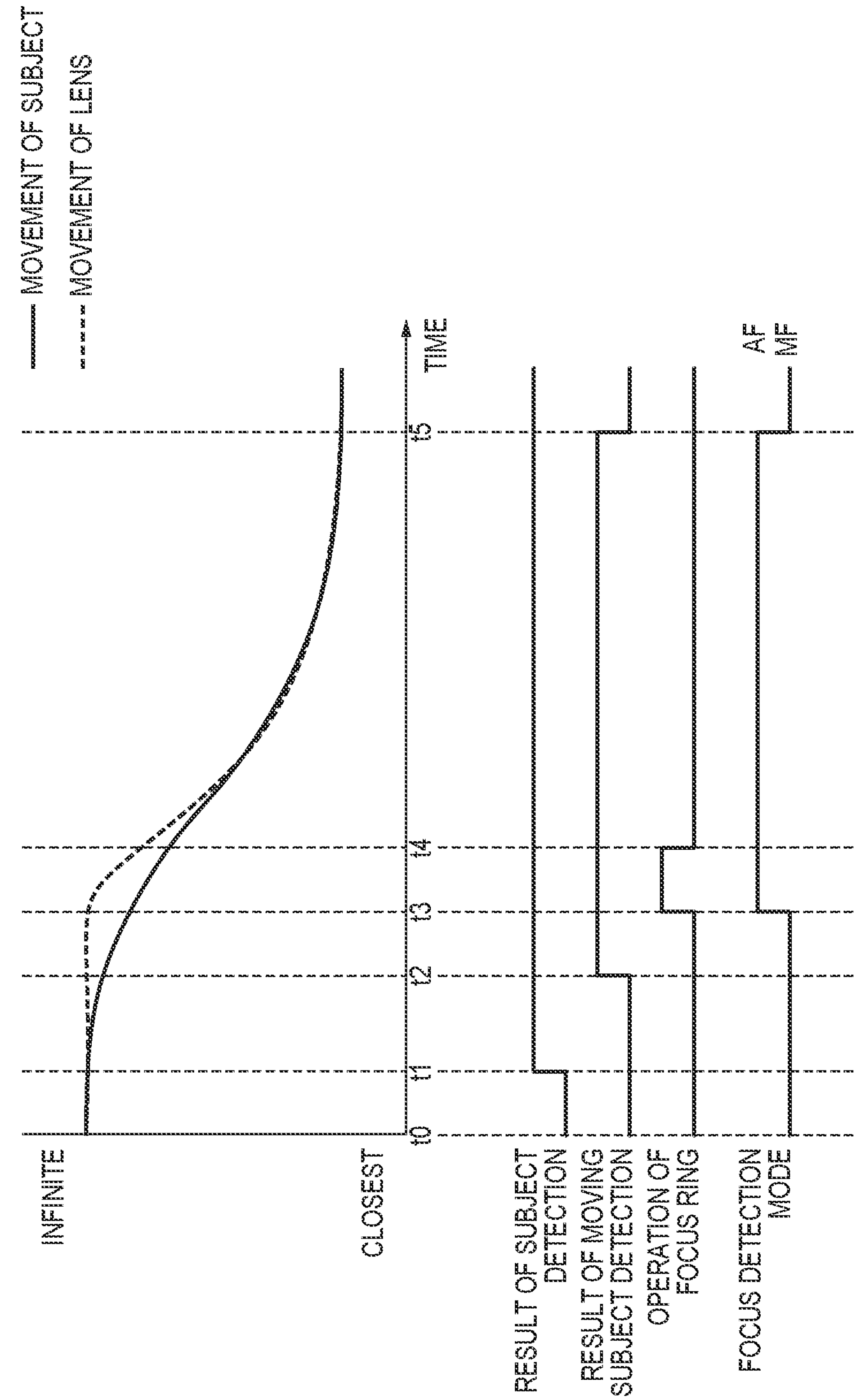
FIG. 4 is a timing chart showing an operation example of focus adjustment control according to the first embodiment.

FIG. 4 is a timing chart illustrating an example in which the focus adjustment control described in FIG. 3 is applied, along with the movement of a subject and a lens in chronological order, and FIGS. 5A to 5E are diagrams showing specific examples thereof. Note that here, the initial state of the focus detection mode is the MF mode (MF mode in step S304).

It is assumed that no subject has been detected yet when shooting is started at time t0, and that a target subject such as a person's face is detected at time t1 (YES in step S305). At this point, the subject is not moving yet (NO in step S306), so the focus detection mode remains the MF mode (the MF mode is maintained in step S310). After that, as the subject moves toward the camera (from FIG. 5A to FIG. 5B), it is detected at time t2 that the position of the image plane has moved from the history of defocus amounts (YES in step S306), but since the user has not operated the focus ring (NO in step S308), the focus detection mode remains at the MF mode (the MF mode is maintained in step S310).

Figure 5A:
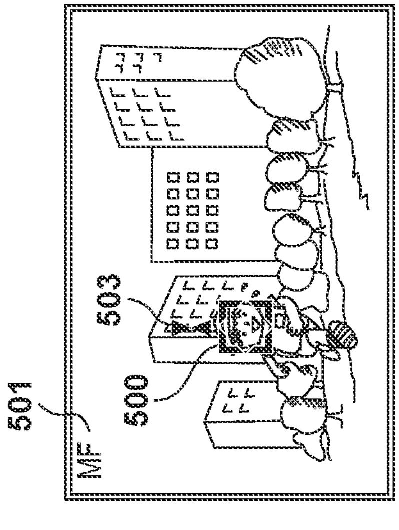
FIGS. 5A to 5E are diagrams showing specific examples of focus adjustment control according to the first embodiment.
Figure 5B:
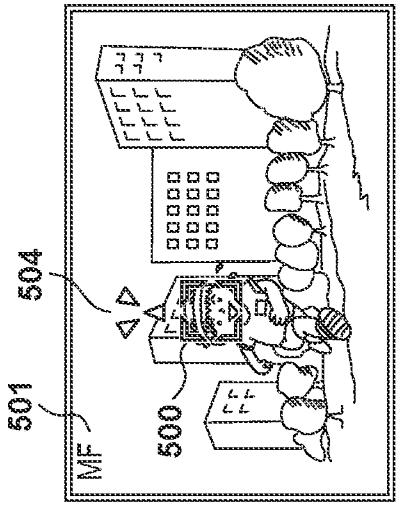
Figure 5C:
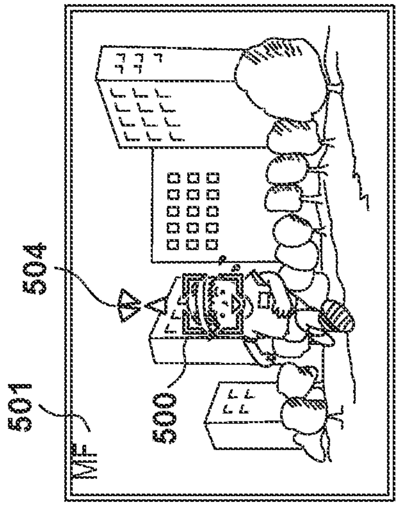
Figure 5D:
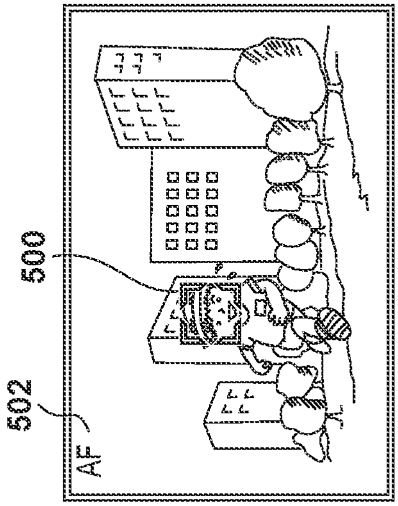
Figure 5E:
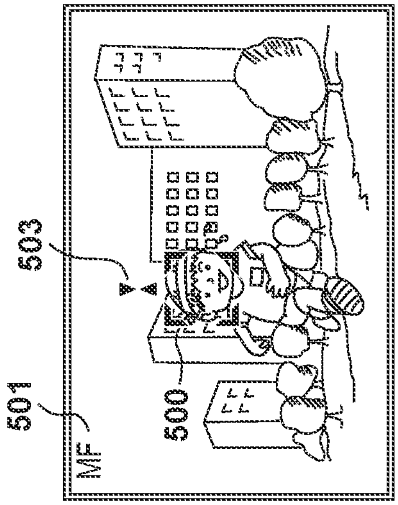

Thereafter, when a focus ring is operated by the user during the period from time t3 to time t4 (YES in step S308, FIG. 5C), the focus detection mode is changed to the AF mode since the condition in step S308 is satisfied at time t3 (changed to the AF mode in step S309), and the camera automatically follows the focus on the subject (FIG. 5D). This state continues even if the focus ring operation by the user stops at time t4 (the AF mode is determined in step S304 and the AF mode is maintained in step S313). The AF mode is canceled when the subject stops moving at time t5 (NO in step S312) and is no longer determined to be a moving subject, and the focus detection mode returns to the MF mode (changed to the MF mode in step S314, FIG. 5E).

During the above processing, as shown in FIGS. 5A to 5E, a frame 500 indicating the detected subject, a character string 501 indicating the MF mode, a character string 502 indicating the AF mode, focus guides 503 and 504 for MF, etc. may be displayed. Note that the focus guides 503 and 504 indicate the focus state of the subject based on the defocus amount, the focus guide 503 indicates the in-focus state as the focus state, and the focus guide 504 indicates the operating direction and the amount of operation of the focus ring.

As described above, according to the first embodiment, by switching the focus detection mode in consideration of the operation state of the focus ring by the user in addition to the detection state and movement of the subject and the focus detection mode, it is possible to perform focus adjustment control according to the user's intention.

Second Embodiment

Next, a second embodiment of the present invention will be described. Note that in the second embodiment, the image capturing apparatus has the same configuration as that described with reference to FIGS. 1 and 2, so the description thereof will be omitted here.

Next, focus adjustment control performed in a case where the moving image shooting mode is set in the image capturing apparatus in the second embodiment will be described with reference to the flowchart of FIG. 6. It should be noted that it is also possible to perform the focus adjustment control during live view shooting in the still image shooting mode. This focus adjustment control is performed by the camera control unit 212 executing a focus adjustment control processing program that is a computer program. In addition, in the processing of FIG. 6, the same step numbers are given to processes similar to those shown in FIG. 3, and description thereof will be omitted as appropriate.

Figure 6:
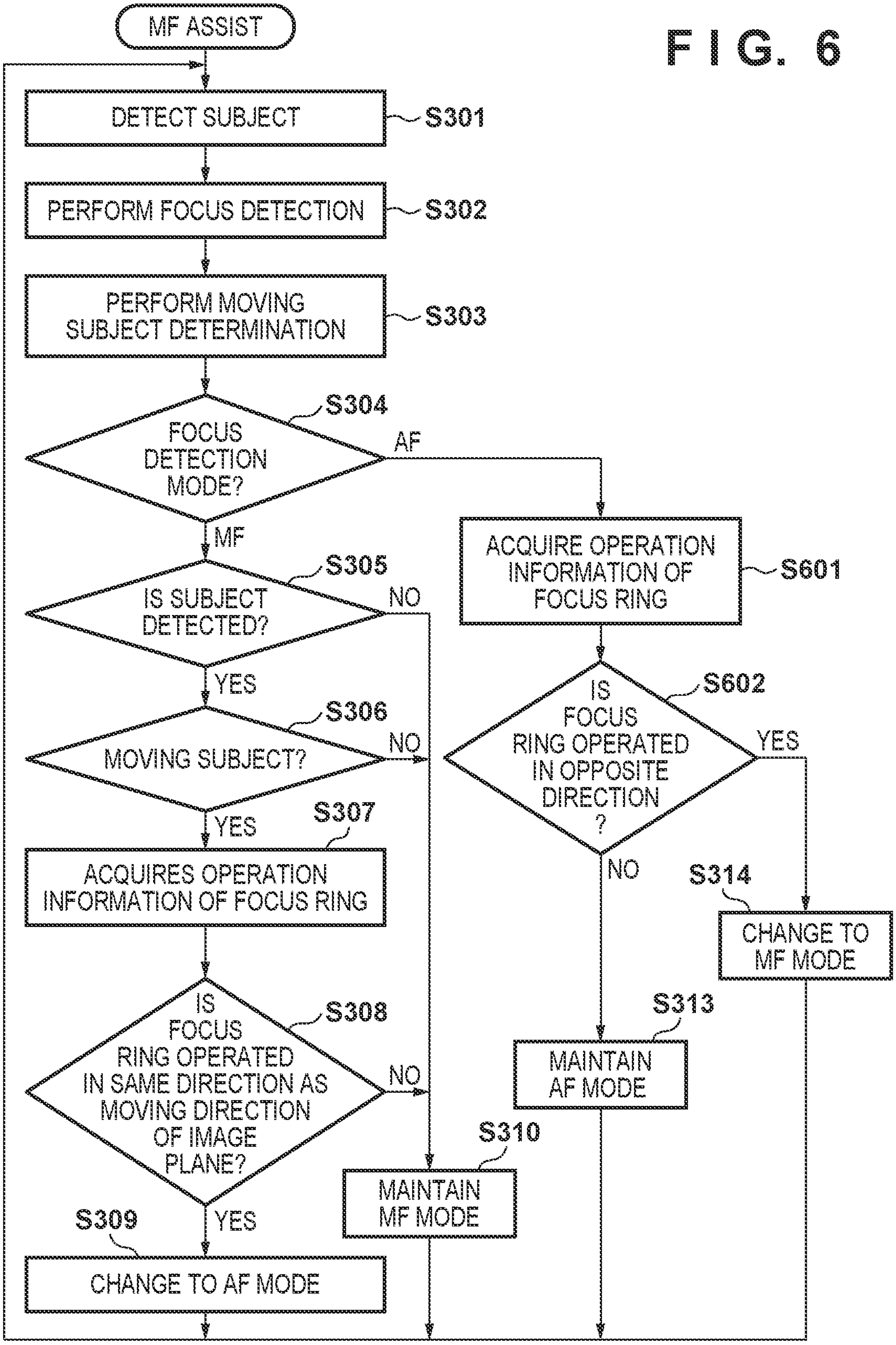
FIG. 6 is a flowchart of focus adjustment control according to a second embodiment.

The difference between the control in the second embodiment shown in FIG. 6 and the control in the first embodiment shown in FIG. 3 resides in the process in a case where it is determined in step S304 that the focus detection mode is the AF mode. If it is determined in step S304 that the camera is in the AF mode, the process proceeds to step S601, and the camera control unit 212 acquires operation information regarding the focus ring operation of the lens operation unit 107 via the lens control unit 106.

Next, in step S602, the camera control unit 212 determines whether the focus ring is being operated so that the moving direction of the position of the image plane of the subject and the moving direction of the focal position of the focus lens 103 are opposite directions. If it is determined that the focus ring is being operated so that the moving directions are the opposite directions, the process proceeds to step S314; if it is determined that the focus ring is being operated so that the moving directions are the same direction, the process proceeds to step S313.

In step S314, the camera control unit 212 changes the focus detection mode from the AF mode to the MF mode. Then, the camera control unit 212 displays a UI indicating the MF mode, and performs MF control according to and the user's operation. On the other hand, in step S313, the camera control unit 212 maintains the AF mode, displays a UI indicating the AF mode, and performs the on-imaging plane phase difference AF.

As described above, if the focus ring is operated in the opposite direction to the direction of movement of the subject with respect to the optical axis direction, it is presumed that the user is trying to focus on a different subject than the one currently being followed. In such a case, by returning the focus detection mode to the MF mode, it is possible to perform focus adjustment according to the user's intention.

As described above, according to the second embodiment, by switching the focus detection mode in consideration of the operation state of the focus ring by the user in addition to the detection state and movement of the subject and the focus detection mode, it is possible to perform focus adjustment control according to the user's intention.

Note that in the above-described embodiment, an image capturing apparatus having the lens unit 10 that can be attached to and detached from the camera body 20, however, the present invention is not limited to this. For example, the present invention can be applied to the image capturing apparatus in which the lens unit and the camera body are integrally formed as one body.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-196563, filed Dec. 8, 2022 which is hereby incorporated by reference herein in its entirety.

What is claimed is:

1. A focus control apparatus comprising one or more processors and/or circuitry which function as:

an acquisition unit that acquires operation information of an operation member for operating a focus lens;

a detection unit that detects a subject based on an image signal obtained from an image sensor; and a control unit that selects a first focus adjustment unit that performs autofocus adjustment based on the image signal or a second focus adjustment unit that performs manual focus adjustment based on operation of the operation member, wherein the control unit selects the first focus adjustment unit or the second focus adjustment unit based on movement of the subject and the operation information, and in a case where the second focus adjustment unit is selected and current operation information indicates that a focal position of the focus lens operated by the operation member is moving in a same direction as a current moving direction of the subject in an optical axis direction of the focus lens, the control unit switches from the second focus adjustment unit to the first focus adjustment unit.

2. The focus control apparatus according to claim 1, wherein the control unit switches to the second focus adjustment unit in a case where the first focus adjustment unit is selected and the subject is no longer detected and/or movement of the subject in a direction of an optical axis of the focus lens is stopped.

3. The focus control apparatus according to claim 1, wherein the control unit switches to the second focus adjustment unit in a case where the first focus adjustment unit is selected and a moving direction of the subject and a moving direction a focal position of the focus lens by the operation of the operation member are opposite.

4. The focus control apparatus according to claim 1, wherein, in a case where the first focus adjustment unit is selected, the control unit controls to display that the first focus adjustment unit is selected in a display device.

5. The focus control apparatus according to claim 1, wherein, in a case where the second focus adjustment unit is selected, the control unit controls to display that the second focus adjustment unit is selected in a display device.

6. The focus control apparatus according to claim 1, wherein the one or more processors and/or circuitry further function as a focus detection unit that detects a focus state of the subject based on the image signal obtained from the image sensor, wherein the control unit controls to display an operation direction and operation amount of the operation member based on the focus state in a case where the second focus adjustment unit is selected.

7. The focus control apparatus according to claim 1, wherein the one or more processors and/or circuitry further function as a setting unit that sets either a still image shooting mode for shooting a still image or a moving image shooting mode for shooting a moving image, wherein the control unit switches between the first focus adjustment unit and the second focus adjustment unit in a case where the moving image shooting mode is set.

8. An image capturing apparatus comprising:

an image sensor;

an operation member for operating a focus lens; and one or more processors and/or circuitry which function as:

a first focus adjustment unit that performs autofocus adjustment based on an image signal obtained from the image sensor;

a second focus adjustment unit that performs manual focus adjustment based on operation of the operation member;

an acquisition unit that acquires operation information of the operation member for operating the focus lens;

a detection unit that detects a subject based on an image signal obtained from the image sensor; and a control unit that selects the first focus adjustment unit or the second focus adjustment unit, wherein the control unit selects the first focus adjustment unit or the second focus adjustment unit based on movement of the subject and the operation information, and in a case where the second focus adjustment unit is selected and current operation information indicates that a focal position of the focus lens operated by the operation member is moving in a same direction as a current moving direction of the subject in an optical axis direction of the focus lens, the control unit switches from the second focus adjustment unit to the first focus adjustment unit.

9. A focus adjustment control method comprising:

acquiring operation information of an operation member for operating a focus lens;

detecting a subject based on an image signal obtained from an image sensor; and selecting a first focus adjustment unit that performs autofocus adjustment based on the image signal or a second focus adjustment unit that performs manual focus adjustment based on operation of the operation member, wherein the first focus adjustment unit or the second focus adjustment unit is selected based on movement of the subject and the operation information, and in a case where the second focus adjustment unit is selected and current operation information indicates that a focal position of the focus lens operated by the operation member is moving in a same direction as a current moving direction of the subject in an optical axis direction of the focus lens, selection is switched from the second focus adjustment unit to the first focus adjustment unit.

10. A non-transitory computer-readable storage medium, the storage medium storing a program that is executable by the computer, wherein the program includes program code for causing the computer to function as a focus control apparatus comprising:

an acquisition unit that acquires operation information of an operation member for operating a focus lens;

a detection unit that detects a subject based on an image signal obtained from an image sensor; and a control unit that selects a first focus adjustment unit that performs autofocus adjustment based on the image signal or a second focus adjustment unit that performs manual focus adjustment based on operation of the operation member, wherein the control unit selects the first focus adjustment unit or the second focus adjustment unit based on movement of the subject and the operation information, and in a case where the second focus adjustment unit is selected and current operation information indicates that a focal position of the focus lens operated by the operation member is moving in a same direction as a current moving direction of the subject in an optical axis direction of the focus lens, the control unit switches from the second focus adjustment unit to the first focus adjustment unit.

* * * * *